(12) United States Patent
Sato

(10) Patent No.: US 7,373,396 B2
(45) Date of Patent: May 13, 2008

(54) INFORMATION DELIVERY SYSTEM AND METHOD AND PROGRAM OF THE SYSTEM

(75) Inventor: Miki Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 1488 days.

(21) Appl. No.: 10/059,000

(22) Filed: Jan. 30, 2002

(65) Prior Publication Data

US 2002/0111988 A1    Aug. 15, 2002

(30) Foreign Application Priority Data

Jan. 30, 2001  (JP)  ............................. 2001-022345
Jan. 25, 2002  (JP)  ............................. 2002-017706

(51) Int. Cl.
  *G06F 15/177* (2006.01)
(52) U.S. Cl. ..................... 709/220; 709/219; 709/228; 700/9; 700/69; 700/79; 700/96; 701/118
(58) Field of Classification Search ................ 709/219, 709/220, 228; 700/9, 69, 79, 96, 245; 701/118
See application file for complete search history.

(56) References Cited

U.S. PATENT DOCUMENTS

| 6,230,111 | B1 * | 5/2001 | Mizokawa | .................. | 702/182 |
| 6,330,493 | B1 * | 12/2001 | Takahashi et al. | .......... | 700/245 |
| 6,466,844 | B1 * | 10/2002 | Ikeda et al. | .................. | 700/245 |
| 6,529,802 | B1 * | 3/2003 | Kawakita et al. | ........... | 700/245 |

| 2003/0040839 | A1 * | 2/2003 | Sabe et al. | .................. | 700/245 |

FOREIGN PATENT DOCUMENTS

| JP | 11-175726 | 7/1999 |
| JP | 11-219341 | 8/1999 |
| JP | 2000-222576 | 8/2000 |
| JP | 2000-317868 A | 11/2000 |
| WO | WO 99/67067 | 12/1999 |

OTHER PUBLICATIONS

Zenkoichi Fujita, "Personal Robot R100, Nihon Robotto Gakkaishi," vol. 18:2, Japan, Robotics Society of Japan, Mar. 15, 2000.
Z. Fujita, "Personal Robot R100, Nihon Robotto Gakkaishi," vol. 18:2, Japan, Robotics Society of Japan, Mar. 15, 2000. 5 pages.
T. Nagata et al., Robot Systems targeting autonomy and distribution, Japan, Ohmsha, Jun. 20, 1995, 6 pages.

* cited by examiner

*Primary Examiner*—LaShonda T Jacobs
(74) *Attorney, Agent, or Firm*—Foley & Lardner LLP

(57) ABSTRACT

An information delivery system and its method and a program of the system, in which plural robots are used and users can obtain information effectively via the plural robots from the wider range than the range where only one robot moves, are provided. Each of the plural robots provides an information delivering means to users and an information exchanging means with an information server. The plural robots and the information server connect to a network. The robot obtains information to be delivered to an identified person from the information storing in the information server. And the robot delivers the obtained information to the identified person.

15 Claims, 9 Drawing Sheets

F I G. 2

| USER ID | SOURCE USER ID | INFORMATION TO BE DELIVERED |
|---------|----------------|------------------------------|
| USER1 | USER2 | message1.mpg |
| USER1 | USER3 | message2.mpg |
| USER2 | USER1 | message3.mpg |
| ⋮ | ⋮ | ⋮ |
| | | |

F I G. 5
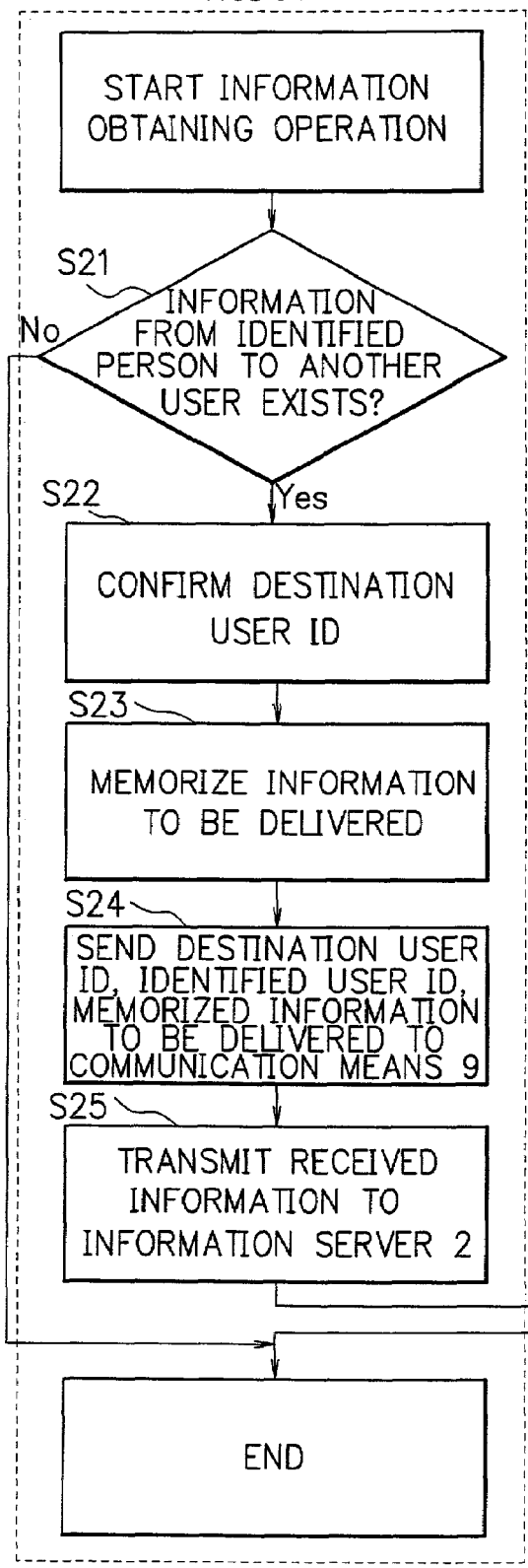
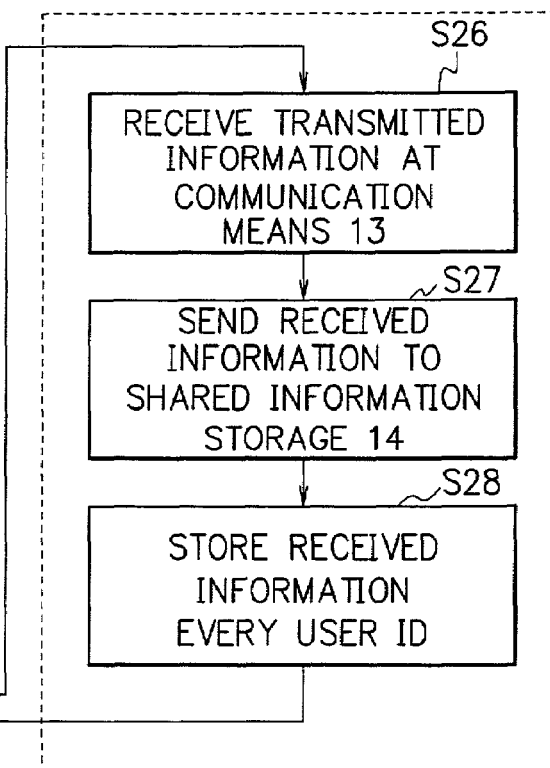

INFORMATION DELIVERY SYSTEM AND METHOD AND PROGRAM OF THE SYSTEM

BACKGROUND OF THE INVENTION

The present invention relates to an information delivery system and its method and a program of the system, in particular, in which plural robots, which can communicate with an information server via a network, are provided, and each of the plural robots has an information delivering means and delivers information to a user who was identified by a person identifying means.

DESCRIPTION OF THE RELATED ART

An information exchanging method among plural persons by using such as e-mails has been widely used. Japanese Patent Application Laid-Open No. HEI 11-219341 discloses "Cooperating Operation Support System." In this patent application, information, which a person desires to deliver to another person, is registered in a shared information database, and another person, who wants to obtain the information, can obtain the information by inputting required conditions. However, another person must operate his/her own terminal by himself/herself, in order to obtain the information by using this system.

Japanese Patent Application Laid-Open No. 2000-222576 discloses "Person Identifying Method and Apparatus and Storing Medium Stored Person Identifying Program and Robot." In this patent application, information such as a message for a specified user is memorized in a robot, and when the robot identified the specified user, the information is delivered to the specified user.

However, this conventional information delivery method used a robot has following problems. First, the moving range of the robot, which delivers information, is limited to a specific area, therefore, there is a problem that users can only obtain information in this moving range of the robot.

Second, at the conventional information delivery method used robots, in case that plural robots are used at the method, it is difficult for users to select a robot, which memorizes necessary information for the user, from the plural robots. Therefore, there is a problem that the information cannot be obtained effectively.

SUMMARY OF THE INVENTION

It is therefore an object of the present invention to provide an information delivery system and its method and a program of the system, in which the range where users can obtain information is widened and also the users can obtain the information effectively even when plural robots are used.

According to a first aspect of the present invention, for achieving the object mentioned above, there is provided an information delivery system. The information delivery system provides plural robots, an information server for storing information transmitted from the plural robots, and a network for connecting the plural robots and the information server. And each of the plural robots provides a person identifying means for identifying persons surrounding each robot, a person inquiring means for transmitting the user ID of a person identified by the person identifying means to the information server via the network, in order to inquire the identified person, an information exchanging means for exchanging information with the information server via the network, and an information delivering means for delivering information obtained from the information server by using the information exchanging means to the identified person. And the information server provides an information exchanging means for exchanging information with the plural robots via the network, and shared information storage for storing information transmitted from the plural robots. And in case that the shared information storage has information for the identified person inquired by the person inquiring means, the information server transmits the information to the robot who inquired the identified person.

According to a second aspect of the present invention, in the first aspect, each of the plural robots further provides a robot movement means for making the robot move by a moving instruction from the information server or by an automatic movement program. And the allocation among the plural robots is optimized by the robot movement means of each robot.

According to a third aspect of the present invention, in the first aspect, each of the plural robots further provides an information memorizing means for memorizing information to be delivered to another user, when the identified user desires to deliver the memorized information to another user, and an input means for inputting the user ID of another user and information to be delivered to another user if any, when the identified user desires to deliver the information to another user. And the information to be delivered to another user is transmitted from the robot to the information server and stored in the shared information storage.

According to a fourth aspect of the present invention, in the first aspect, the person identifying means detects the persons by image recognition and/or voice recognition and identifies the persons by the result of the image recognition and/or the voice recognition.

According to a fifth aspect of the present invention, in the second aspect, each of the plural robots further provides an obstacle detecting means for detecting obstacles in the moving direction of the robot, and an obstacle avoiding means for avoiding the obstacles based on information from the obstacle detecting means.

According to a sixth aspect of the present invention, there is provided an information delivery system. The information delivery system provides plural robots, a person identifying apparatus, an information server for storing information transmitted from the plural robots, and a network for connecting the plural robots, the person identifying apparatus, and the information server. And each of the plural robots provides an image and/or voice obtaining means for obtaining images and/or voices of persons surrounding each robot, an information exchanging means for exchanging information with the person identifying apparatus and the information server via the network, an information memorizing means for memorizing information to be delivered to another user, an input means for inputting the user ID of another user and information to be delivered to another user if any, an information delivering means for delivering information obtained from the information server by using the information exchanging means to an identified person, a robot movement means for making the robot move by a moving instruction from the information server or by an automatic movement program, an obstacle detecting means for detecting obstacles in the moving direction of the robot, and an obstacle avoiding means for avoiding the obstacles based on information from the obstacle detecting means. And the information server provides an information exchanging means for exchanging information with the plural robots and the person identifying apparatus via the network, and shared information storage for storing information transmitted from the plural robots. And the person identifying apparatus provides an information exchanging means for exchanging information with the plural robots and the information server, and a person detecting means for detecting persons from the information transmitted from each of the plural robots, and a person identifying means for identifying the person detected at the person detecting means. When the robot transmits the information obtained at the image and/or voice obtaining means and the robot ID of the robot to the person identifying apparatus, and the person identifying apparatus identified a person from the information transmitted from the robot, the person identifying apparatus transmits information of the identified person to the robot, the robot receives information to be delivered to the identified person from the information server by transmitting the information transmitted from the person identifying apparatus, and delivers the information to the identified person at the information delivering means. When the identified person desires to transmit information to another person, the identified person make the information memorizing means memory information to be delivered to another person and input the user ID of another person at the input means and input information to be delivered to another person if any, and transmits the user ID and the information to the information server, and the information server stores the information to be delivered to another person. And when the robot delivered the information to the identified person, the allocation among the plural robots is optimized by the robot movement means of each robot by the moving instruction from the information server or the automatic movement program of each robot, by that the plural robots move by using the robot movement means, the obstacle detecting means and the obstacle avoiding means.

According to a seventh aspect of the present invention, there is provided an information delivery method that delivers information to each of plural robots by using an information server which stores information transmitted from the plural robots and a network which connects the plural robots and the information server. The information delivery method provides the steps of; identifying persons surrounding each robot by each of the plural robots, inquiring an identified person by transmitting the user ID of the identified person to the information server from the robot via the network, transmitting information to the robot from the information server, when the information server has the information to be delivered to the identified person based on the inquiry from the robot, receiving the information transmitted from the information server at the robot, and delivering information received from the information server to the identified person.

According to an eighth aspect of the present invention, in the seventh aspect, the information delivery method further provides the step of; making the robot move by a moving instruction from the information server or by an automatic movement program. And the allocation among the plural robots is optimized by the robot movement means of each robot.

According to a ninth aspect of the present invention, in the seventh aspect, the information delivery method further provides the steps of; in case that the identified person desires to deliver information to another user, memorizing information to be delivered to another user in the robot, inputting the user ID of another user and information to be delivered to another user if any, transmitting the user ID and the information to be delivered to another user to the information server, storing the user ID and the information to be delivered to another user in the information server.

According to a tenth aspect of the present invention, in the seventh aspect, the identifying persons is executed by detecting the persons by image recognition and/or voice recognition.

According to an eleventh aspect of the present invention, in the eighth aspect, the information delivery method further provides the steps of; detecting obstacles in the moving direction of the robot, and avoiding the obstacles based on information from the obstacle detecting means, when the robot moves.

According to a twelfth aspect of the present invention, there is provided an information delivery method that delivers information to each of plural robots by using an information server which stores information transmitted from the plural robots and a person identifying apparatus and a network which connects the plural robots and the information server and the person identifying apparatus. The information delivery method provides the steps of; obtaining images and/or voices of persons surrounding each robot at each of the plural robots, transmitting the image and/or voice of a person obtained at each robot and the robot ID of the robot from the robot to the person identifying apparatus via the network, identifying the person at the person identifying apparatus, transmitting identified result at the person identifying apparatus to the robot via the network, transmitting the identified result to the information server, transmitting information to be delivered to the identified person from the information server to the robot via the network, when the information server has the information to be delivered to the identified person, receiving the information to be delivered to the identified person at the robot, and delivering the information to the identified person. And in case that the identified person desires to deliver information to another user, memorizing information to be delivered to another user and inputting the user ID of another user and information to be delivered to another user if any at the robot, transmitting the user ID and the memorized information to the information server from the robot via the network, and storing the user ID and the information in the information server. And in case that the robot did not obtain any image and/or voice of a person, making the robot move by a moving instruction from the information server or by an automatic movement program, by avoiding obstacles by detecting obstacles in the moving direction of the robot, and making optimum allocation among the plural robots.

According to a thirteenth aspect of the present invention, there is provided an information delivery program of an information delivery system that delivers information to each of plural robots by using an information server which stores information transmitted from the plural robots and a network which connects the plural robots and the information server. The information delivery program provides the steps of; identifying persons surrounding each robot by each of the plural robots, inquiring an identified person by transmitting the user ID of the identified person to the information server from the robot via the network, transmitting information to the robot from the information server, when the information server has the information to be delivered to the identified person based on the inquiry from the robot, receiving the information transmitted from the information server at the robot, and delivering information received from the information server to the identified person.

According to a fourteenth aspect of the present invention, in the thirteenth aspect, the information delivery program further provides the step of; making the robot move by a moving instruction from the information server or by an automatic movement program. And the allocation among the plural robots is optimized by the robot movement means of each robot.

According to a fifteenth aspect of the present invention, in the thirteenth aspect, the information delivery program further provides the steps of; in case that the identified person desires to deliver information to another user, memorizing information to be delivered to another user in the robot, inputting the user ID of another user and information to be delivered to another user if any, and transmitting the user ID and the information to be delivered to another user to the information server, and storing the user ID and the information to be delivered to another user in the information server.

According to a sixteenth aspect of the present invention, in the thirteenth aspect, the identifying persons is executed by detecting the persons by image recognition and/or voice recognition.

According to a seventeenth aspect of the present invention, in the fourteenth aspect, the information delivery program further provides the steps of; detecting obstacles in the moving direction of the robot, and avoiding the obstacles based on information from the obstacle detecting means, when the robot moves.

According to an eighteenth aspect of the present invention, there is provided an information delivery program of an information delivery system that delivers information to each of plural robots by using an information server which stores information transmitted from the plural robots and a person identifying apparatus and a network which connects the plural robots and the information server and the person identifying apparatus. The information delivery program provides the steps of; obtaining images and/or voices of persons surrounding each robot at each of the plural robots, transmitting the image and/or voice of a person obtained at each robot and the robot ID of the robot from the robot to the person identifying apparatus via the network, identifying the person at the person identifying apparatus, transmitting identified result at the person identifying apparatus to the robot via the network, transmitting the identified result to the information server, transmitting information to be delivered to the identified person from the information server to the robot via the network, when the information server has the information to be delivered to the identified person, receiving the information to be delivered to the identified person at the robot, and delivering the information to the identified person. And in case that the identified person desires to deliver information to another user, memorizing information to be delivered to another user and inputting the user ID of another user and information to be delivered to another user if any at the robot, transmitting the user ID and the memorized information to the information server from the robot via the network, and storing the user ID and the information in the information server. And in case that the robot did not obtain any image and/or voice of a person, making the robot move by a moving instruction from the information server or by an automatic movement program, by avoiding obstacles by detecting obstacles in the moving direction of the robot, and making optimum allocation among the plural robots.

BRIEF DESCRIPTION OF THE DRAWINGS

The objects and features of the present invention will become more apparent from the consideration of the following detailed description taken in conjunction with the accompanying drawings in which:

FIG. 2 is a diagram showing an example of a storing format in shared information storage at embodiments of the information delivery system of the present invention;

FIG. 5 is a flowchart showing information obtaining operation of the robot in the information delivery system at the first embodiment of the present invention;

DESCRIPTION OF THE PREFERRED EMBODIMENTS

Figure 1:
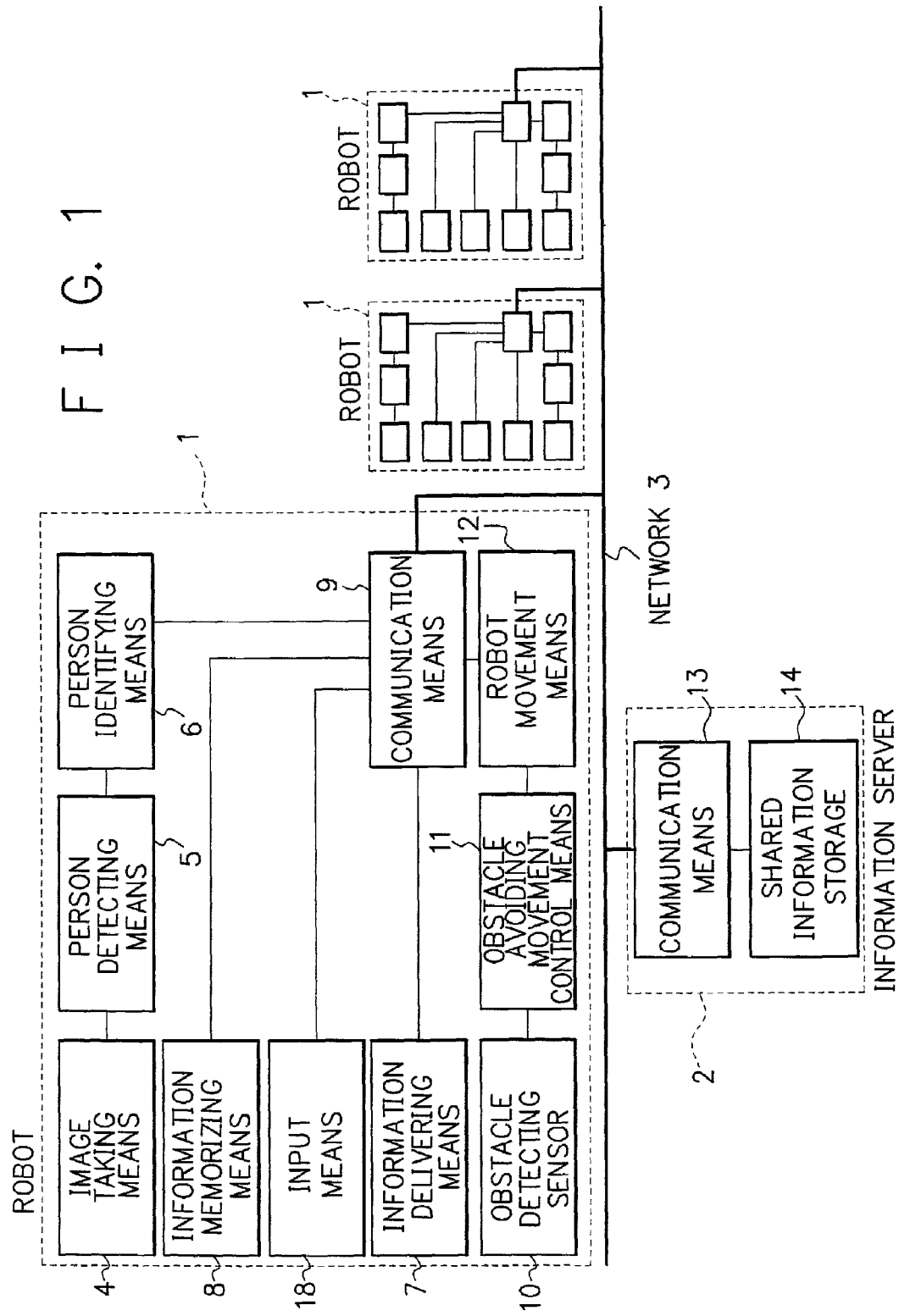
FIG. 1 is a diagram showing a structure of a first embodiment of an information delivery system of the present invention.

Referring now to the drawings, embodiments of the present invention are explained in detail. FIG. 1 is a diagram showing a structure of a first embodiment of an information delivery system of the present invention.

As shown in FIG. 1, plural robots 1 are connected to an information sever 2 via a network 3. Each of the plural robots 1 consists of an image taking means 4, a person detecting means 5, a person identifying means 6, an information delivering means 7, an information memorizing means 8, a communication means 9, an obstacle detecting sensor 10, an obstacle avoiding movement control means 11, a robot movement means 12, and an input means 18. In this, actually, the plural robots 1 are provided in the information delivery system, however, in order to make the explanation simple, one robot 1 is used for the explanation.

The image taking means 4 takes moving images by using such as a video camera and a digital charge coupled device (CCD) camera, and outputs still images sequentially.

The person detecting means 5 can judge whether persons exist or not in the image taking range, based on the position, size, and movement of the head part of each person, by processing the images outputted from the image taking means 4. When the person detecting means 5 detected a person, the person detecting means 5 extracts the head part image of the person from the images outputted from the image taking means 4, and outputs the head part image of the person.

The person identifying means 6 memorizes image information and the user ID of each user in an internal memory (not shown) in the robot 1 beforehand. The person identifying means 6 compares the head part image of the person extracted from the person detecting means 5 with the image information of each user memorizing in the internal memory in the robot1 by processing the head part image of the person. And the person identifying means 6 identifies the person detected by the person detecting means 5 by using the compared result and outputs the identified result with the user ID.

The information delivering means 7 delivers information to the identified person as image information and/or voice information by using a display and/or a speaker. In this, the information to the identified person is information to be delivered to the identified person.

The information memorizing means 8 memorizes image information and/or voice information, which can be delivered from the information delivering means 7 to other users, from the image taking means 4 and/or a microphone or by inserting a recording medium, such as a floppy disk, and outputs the memorized information. Further, the information memorizing means 8 can memorize the information inputted from the input means 18.

The communication means 9 transmits the identified result at the person identifying means 6, the information memorized in the information memorizing means 8, and information inputted from the input means 18 to the information server 2 via the network 3. Further, the communication means 9 receives information from the information server 2 and transmits the received information to the information delivering means 7, and also transmits a moving instruction from the information server 2 to the robot movement means 12.

The obstacle detecting sensor 10 detects an obstacle at the time when the robot 1 moves, for example, an obstacle in the moving direction of the robot 1, by using such as an ultrasonic wave sensor and an infrared sensor, and sends the detected obstacle information to the obstacle avoiding movement control means 12. The obstacle detecting sensor 10 can include the image taking means 4, in this case, the video camera or the digital CCD camera in the image taking means 4 can be used as an image sensor for the obstacle detecting sensor 10.

The obstacle avoiding movement control means 11 makes the robot movement means 12 avoid an obstacle by controlling the robot movement means 12, based on the information from the obstacle detecting sensor 10.

The robot movement means 12 moves the robot 1 by a moving instruction from the information server 2 or by an automatic moving program decided beforehand, for example, by driving wheels of the robot1 by a motor. And the robot movement means 12 avoids the obstacle based on the control from the obstacle avoiding movement control means 11.

The input means 18, with which a user inputs information such as a user ID by tapping a keyboard, outputs the inputted information to the communication means 9. And the input means 18, for example, provides a microphone, and outputs the inputted information such as the user ID to the communication means 9, by that voice information is inputted by the microphone, this is also possible. As mentioned above, the information inputted from the input means 18 can be memorized in the information memorizing means 8.

The information server 2 provides a communication means 13 and shared information storage 14. The communication means 13 receives information from the robot 1 via the network 2, and sends the received information to the shared information storage 14. And also the communication means 13 transmits information received from the shared information storage 14 to the robot 1 via the network 2.

The shared information storage 14 extracts necessary information from the information storing in the shared information storage 14, based on the information received from the communication means 13, and sends the extracted information to the communication means 13. And the shared information storage 14 stores the information received from the communication means 13, corresponding to a storing format being mentioned later.

FIG. 2 is a diagram showing an example of the storing format in the shared information storage 14 at the embodiments of the information delivery system of the present invention. As shown in FIG. 2, the storing format provides a (destination) user ID column, a source user ID column, and an information to be delivered column. As the information in this storing format, all-type information, which can be delivered by the information delivering means 7 in the robot 1, can be used. At the embodiments of the present invention, moving files by moving picture experts group (MPEG) are stored in the shared information storage 14.

As shown in FIG. 2, an example of the information storing in the shared information storage 14 is shown. That is, a message 1 to the user ID 1 from the user ID 2, a message 2 to the user ID 1 from the user ID3, and a message 3 to the user ID 2 from the user ID 1 have been stored in the shared information storage 14.

Figure 3:
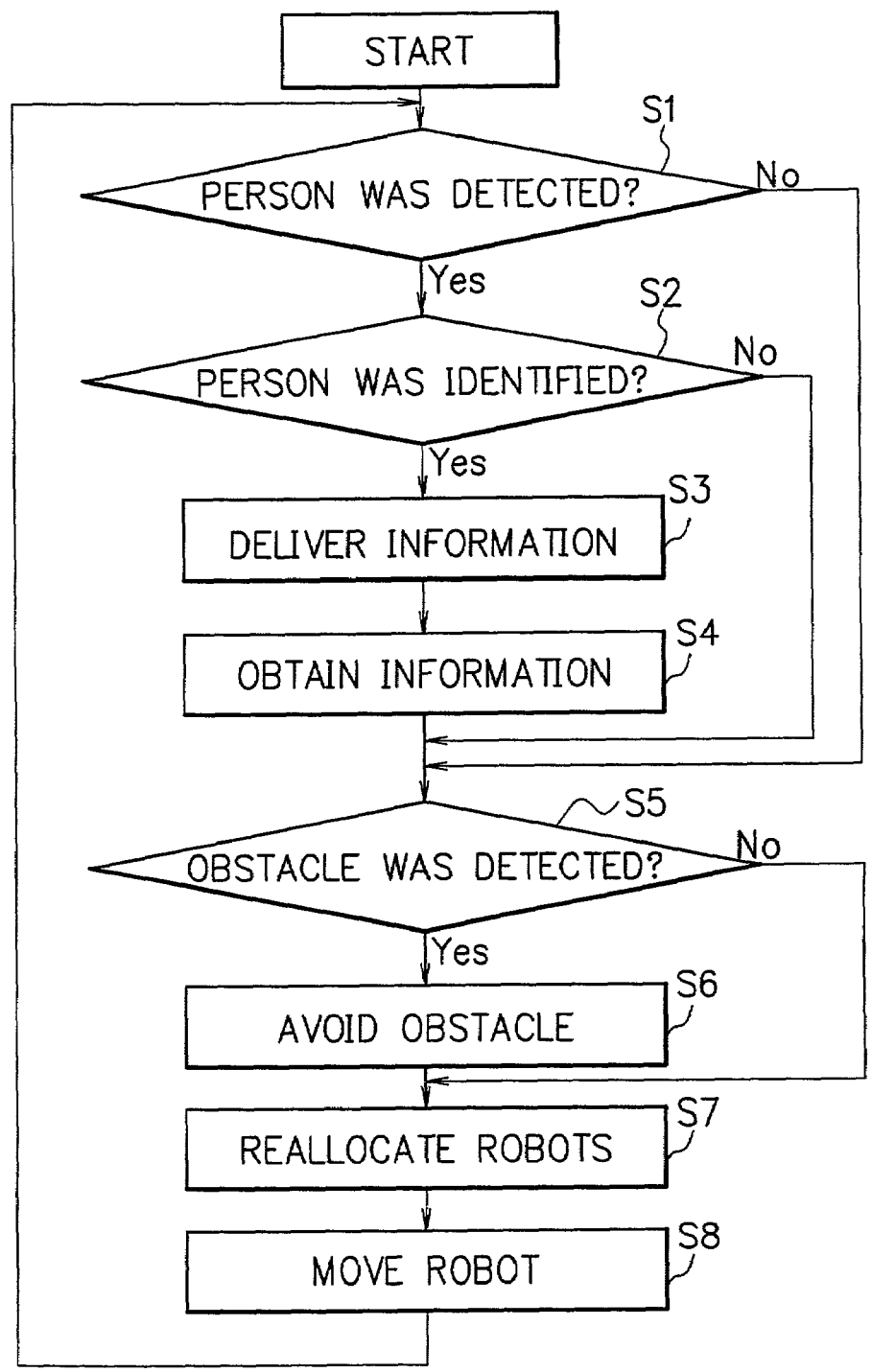
FIG. 3 is a flowchart showing operation of a robot in the information delivery system at the first embodiment of the present invention.

Next, operation of each function in the information delivery system at the first embodiment of the present invention is explained. FIG. 3 is a flowchart showing the operation of the robot 1 in the information delivery system at the first embodiment of the present invention. The robot 1 always detects persons, and when a person was detected, the detected person is identified, and the user ID of the detected person is transmitted to the information server 2 via the network 3. And the robot 1 obtains necessary information from the information server 2, and delivers the information obtained from the information server 2 to the identified person (user). When information, which is to be delivered to another user from the identified person (user), exists, the robot 1 memorizes the information to be delivered to another user, and transmits the memorized information to the information server 2 via the network 3. After this operation, or when the robot 1 did not detect a person, or detected a person but not identified the person, the robot 1 moves by avoiding obstacles.

Referring to the flowchart shown in FIG. 3, the operation of the robot1 1 is explained in detail. When the robot 1 detected a person at the person detecting means 5 (Yes at step S1), the person identifying means 6 identifies the detected person and when the person was identified (Yes at step S2), the robot 1 delivers information to the identified person (step S3), that is, information delivery operation is executed. After this, the robot 1 obtains information (step S4), that is, information obtaining operation is executed. The information delivery operation and the information obtaining operation are explained in detail later. When the robot 1 finished the operation from the step S1 to the step S4, or when the robot 1 could not detect a person (No at the step S1), or could not identify the detected person (No at the step S2), the robot 1 detects an obstacle at the obstacle detecting sensor 10. When an obstacle was detected (Yes at step S5), the robot 1 avoids the obstacle (step S6), after finishing the obstacle avoiding operation, or an obstacle was not detected (No at the step S5), robot reallocation operation is executed (step S7).

Actually, plural robots 1 are allocated in various positions, therefore, this robot reallocation operation is effective. As the robot reallocation operation, the following operation is executed. Each robot 1 in the plural robots 1 transmits a surrounding scene of each robot 1 taken by the image taking means 4 to the information server 2. The information server 2 instructs each robot 1 to move to a position instructed by the information server 2 so that the plural robots 1 are positioned in a designated layout, which the information server 2 calculated by a designated algorithm. Or, each robot 1 provides a global positioning system (GPS), and the information server 2 obtains the position information of each robot 1 from the information from the GPS, and instructs each robot 1 to move to a designated position. Or, each robot 1 moves to a designated position corresponding to a predetermined automatic movement program.

The robot 1 moves to a position instructed by the information server 2 or a position designated by the predetermined automatic movement program (step S8). And the operation of the robot 1 returns to the step S1.

Next referring to a drawing, the information delivery operation mentioned at the step S3 in FIG. 3 is explained in detail. As mentioned above, after the robot 1 identified the person, in case that the information to be delivered to the identified person exists, the robot 1 obtains information to be delivered to the identified person from the information server 2. And the robot 1 delivers the information to the identified person, by receiving the information from the information server 2.

Figure 4:
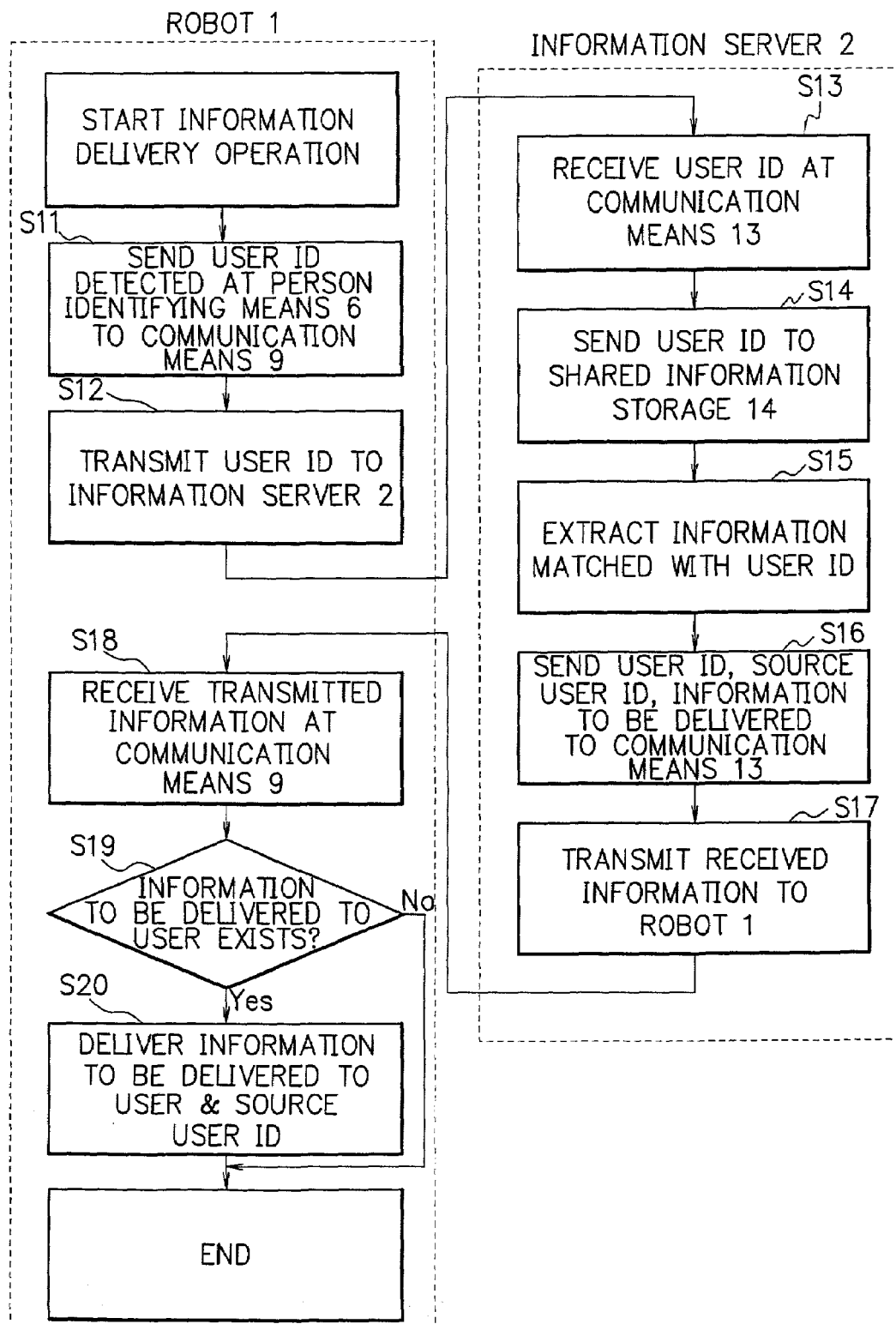
FIG. 4 is a flowchart showing information delivery operation of the robot in the information delivery system at the first embodiment of the present invention.

FIG. 4 is a flowchart showing the information delivery operation of the robot 1 in the information delivery system at the first embodiment of the present invention. In the robot 1, the user ID of the person identified at the person identifying means 6 is sent to the communication means 9 (step S11), the communication means 9 transmits the user ID to the information sever 2 via the network 3 (step S12). In the information server 2, the communication means 13 receives the user ID of the detected person (step S13), and the communication means 13 sends the user ID to the shared information storage 14 (step S14). The shared information storage 14 extracts information to be delivered to the user (message) and the source user ID, from the storing information in the shared information storage 14, when the user ID sent from the communication means 13 matches with the user ID in the storing information (step S15). The shared information storage 14 sends the user ID, and the massage to the user and the source user ID extracted from the storing information to the communication means 13 (step S16). The communication means 13 transmits the information (the user ID, the message to the user, and the source user ID) to the robot 1 via the network 3, in a format being explained later (step S17). In the robot 1, the communication means 9 receives the information from the information server 2 via the network 3 (step S18). When the information to be delivered to the user exists in the received information (Yes at step S19), the communication means 9 sends the user ID, the source user ID, and the message to the information delivering means 7. The information delivering means 7 delivers the source user ID and the message to the user (step S20). In this, it is possible to add a function that the information delivering means 7 informs the user about that the message arrived by announcing the name of the user by using a voice. When the delivering the message to the user finished, or the message to the user did not exist (No at the step S19), the operation ends.

Next referring to a drawing, the information obtaining operation mentioned at the step S4 in FIG. 3 is explained in detail. As mentioned above, after the robot 1 identified the person, in case that the information to be delivered to another person from the identified person exists, the robot 1 memorizes the information to be delivered to another person. And the robot 1 transmits the memorized information to be delivered to another person to the information server 2. The information server 2 stores the transmitted information.

FIG. 5 is a flowchart showing the information obtaining operation of the robot 1 in the information delivery system at the first embodiment of the present invention. When information to be delivered to another person from the identified person exists (Yes at step S21), the identified person confirms the destination user ID (another person) by inputting the destination user ID at the input means 18 (step S22). The information memorizing means 8 memorizes the information to be delivered to another user by inputting directly to the information memorizing means 8 by using, for example, a floppy disk, or by inputting from the inputting means 18 (step S23). The destination user ID (user ID) inputted at the input means 18, the user ID (source user ID) of the person identified at the person identifying means 6, and the information to be delivered to another person memorized at the information memorizing means 8 are sent to the communication means 9 (step S24). The communication means 9 transmits the received information to the information server 2 via the network 3, in a format being mentioned later (step S25). In the information server 2, the communication means 13 receives the information transmitted from the robot 1 via the network 3 (step S26), and the communication means 13 sends the received information to the shared information storage 14 (step S27). The shared information storage 14 extracts the user ID (destination user ID of another person), the source user ID (user ID of the identified person), and the message to be delivered to another person, and stores the extracted information every user ID (step S28). When information to be delivered to another person from the identified person does not exist (No at the step S21), or when the step S28 finished, the information obtaining operation ends.

Figure 6:
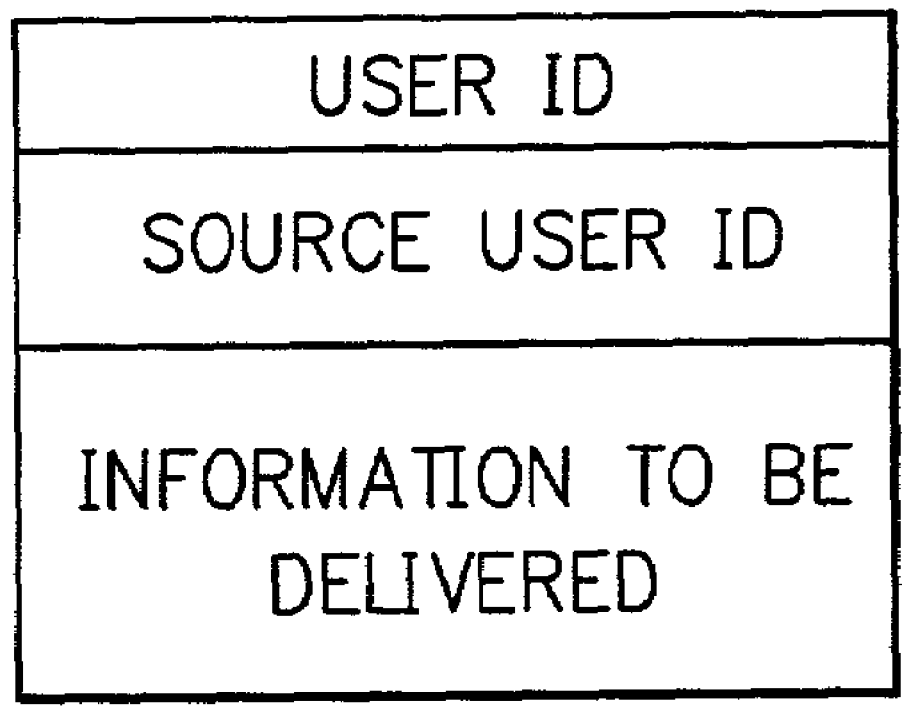
FIG. 6 is a diagram showing an example of a format of information transmitting between the robot and the information server at the embodiments of the information delivery system of the present invention.

FIG. 6 is a diagram showing an example of a format of information transmitting between the robot 1 and the information server 2 at the embodiments of the information delivery system of the present invention. As shown in FIG. 6, the format includes the user ID, the source user ID, and the information to be delivered to the user of the user ID. In case that information is transmitted from the information server 2 to the robot 1, the user ID, the source user ID, and the information to be delivered to the user of the user ID, which have been stored in the shared information storage 14, are the user ID, the source user ID, and the information to be delivered to the user of the user ID. In case that information is transmitted from the robot 1 to the information server 2, the destination user ID confirmed at the step S22 is made to be the user ID. And the user ID identified at the person identifying means 6 in the robot 1 is made to be the source user ID. And the information memorized at the step S23 is made to be the information to be delivered to the user of the user ID.

At the first embodiment of the present invention, when the robot 1 identified a person, the information delivery operation mentioned above is executed to the identified person. However, the information server 2 transmits one or plural user ID to a specified robot 1 or all robots connecting via the network 3, based on the storing information in the information server 2, and each robot 1 executes the information delivery operation only when the user ID transmitted from the information server 2 matches with the user ID of the identified person. This information delivery operation is also possible.

Figure 7:
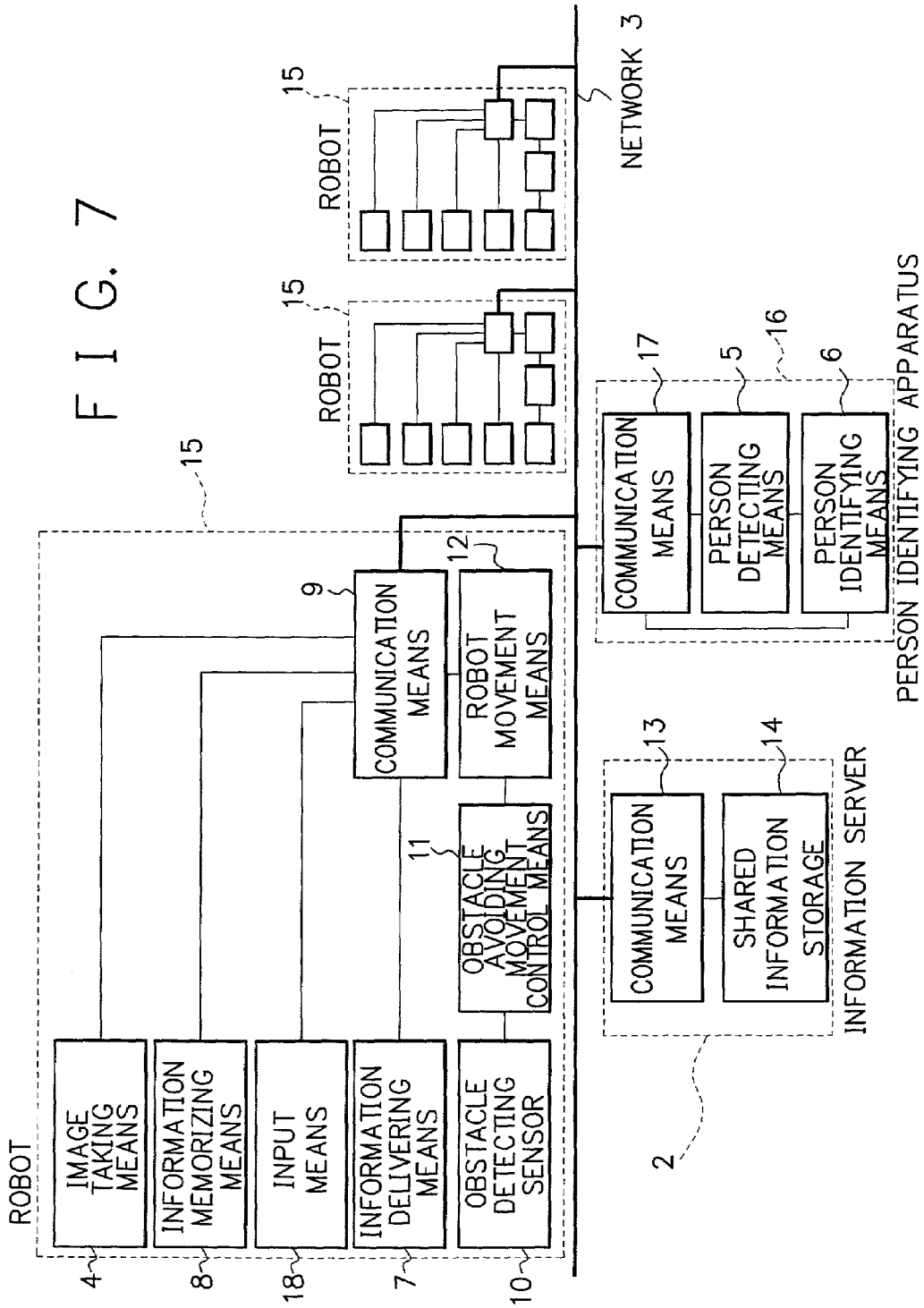
FIG. 7 is a diagram showing a structure of a second embodiment of the information delivery system of the present invention.

Next, referring to drawings, a second embodiment of the present invention is explained. FIG. 7 is a diagram showing a structure of the second embodiment of the information delivery system of the present invention. As shown in FIG. 7, the information delivery system at the second embodiment of the present invention consists of plural robots 15, a person identifying apparatus 16, an information server 2, and a network 3. And the plural robots 15, the person identifying apparatus 16, the information server 2 are connected via the network 3. Each of the plural robots 15 does not provides a person detecting means 5 and a person identifying means 6, and the person identifying apparatus 16 is newly added, compared with the first embodiment. At the second embodiment, each function, which has almost the same function that the first embodiment has, has the same reference number. And as same as the first embodiment, actually the plural robots 15 are provided in the information delivery system, however, in order to make the explanation simple, one robot 15 is used to explain the second embodiment.

In the robot 15, the communication means 9 transmits the robot ID of each robot of the plural robots 15 and image information taken by the image taking means 4 to the person identifying apparatus 16. The robot ID is information identifying each robot in the plural robots 15 and is registered beforehand for each robot. And also the communication means 9 receives the identified result from the person identifying apparatus 16. Further, the communication means 9 transmits the identified result from the person identifying apparatus 16, information memorized at the information memorizing means 8, and information inputted at the input means 18 to the information server 2 via the network 3. The communication means 9 receives information from the information server 2 and sends the received information to the information delivering means 7, and also sends a robot movement instruction received from the information server 2 to the robot movement means 12.

The structure of the information server 2 is the same at the first embodiment.

The person identifying apparatus 16 consists of a communication means 17, a person detecting means 5, and a person identifying means 6. The communication means 17 sends image information, outputted from the image taking means 4 in the information transmitted from the robot 15, to the person detecting means 5. And also, the communication means 17 transmits the result identified at the person identifying means 6 to the robot 15. The person detecting means 5 extracts the image of the head part of a person by processing the image information outputted from the image taking means 4, sent from the communication means 17, as the same as at the first embodiment. The person identifying means 6 is the same at the first embodiment, therefore, its explanation is omitted.

Figure 8:
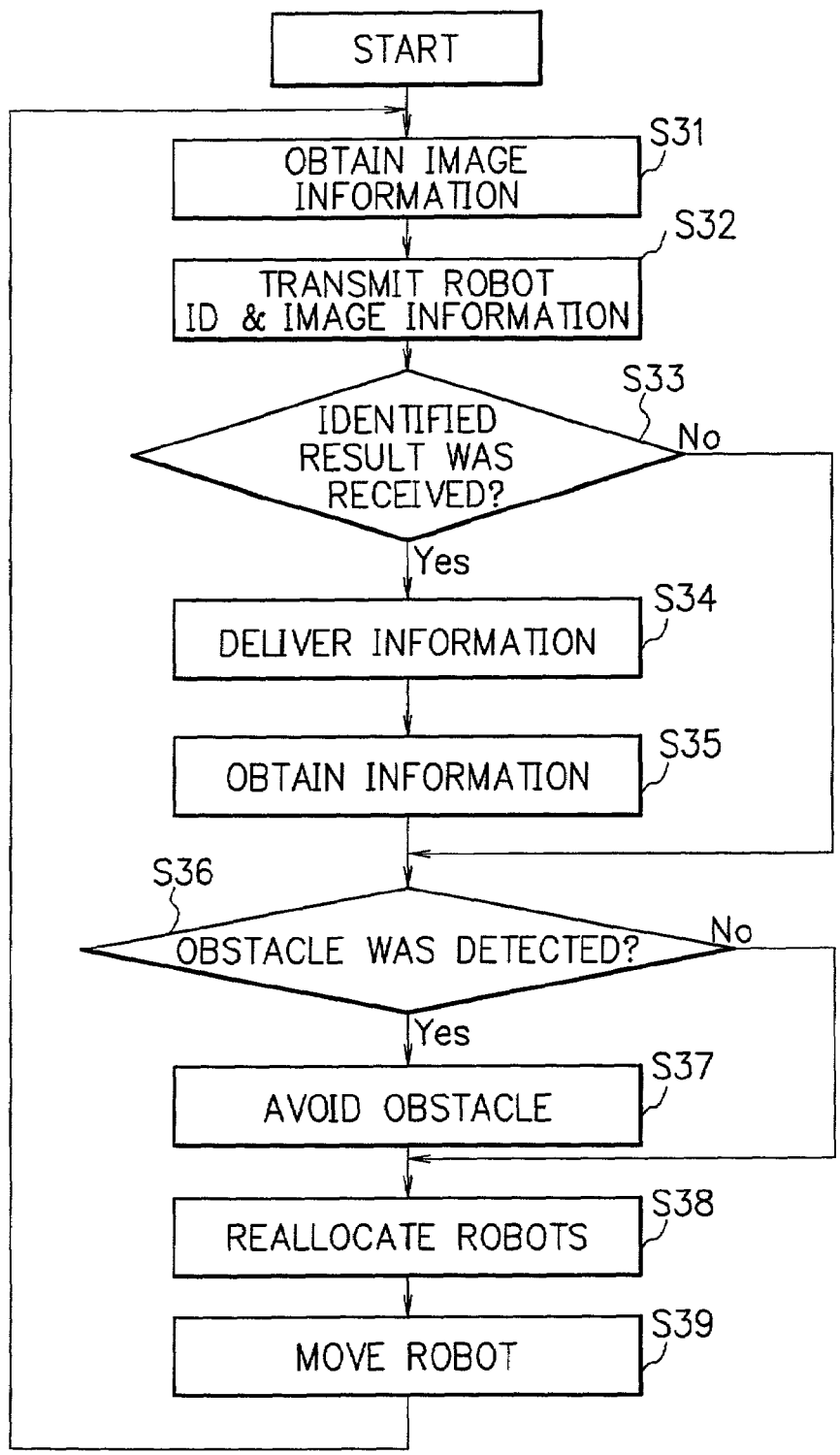
FIG. 8 is a flowchart showing operation of a robot in the information delivery system at the second embodiment of the present invention.

Next, operation of each function in the information delivery system at the second embodiment of the present invention is explained. FIG. 8 is a flowchart showing operation of the robot 15 in the information delivery system at the second embodiment of the present invention. The robot 15 always transmits surrounding scenes of the robot 15 to the person identifying apparatus 16. When the robot 15 receives the identified result from the person identifying apparatus 16, the robot 15 transmits the user ID of the identified person to the information server 2. And the robot 15 obtains necessary information from the information server 2, and delivers the information obtained from the information server 2 to the identified person. When information, which is to be delivered to another user from the identified person, exists, the robot 15 obtains the information to be delivered to another user, and transmits the obtained information to the information server 2 via the network 3. After this operation, or when the robot 15 did not receive the identified result from the person identifying apparatus 16, the robot 15 moves by avoiding obstacles.

Figure 9:
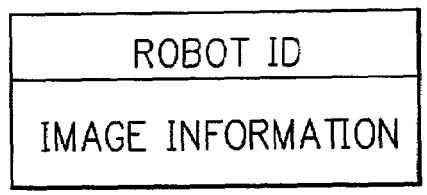
FIG. 9 is a format of image information transmitting from the robot to a person identifying apparatus at the second embodiment of the information delivery system of the present invention.

Referring to the flowchart shown in FIG. 8, the operation of the robot1 15 is explained in detail. The robot 15 obtains image information at the image taking means 4 (step S31). FIG. 9 is a format of image information transmitting from the robot 15 to the person identifying apparatus 16 at the second embodiment of the information delivery system of the present invention. The robot 15 transmits the robot ID and the obtained image information to the person identifying apparatus 16 by using the communication means 9, corresponding to the format shown in FIG. 9 (step S32). The person identifying apparatus 16 executes person identifying operation being mentioned later, and when the person identifying apparatus 16 identified a person, the person identifying apparatus 16 transmits the identified result being the user ID of the identified person to the robot 15. The robot 15 receives the identified result being the user ID of the identified person (step S33). When the robot 15 received the identified result (Yes at the step S33), the robot 15 delivers the information to the user, that is, the robot 15 executes information delivery operation (step S34). And the robot 15 obtains information to deliver to another person, that is, the robot executes information obtaining operation (step S35). The information delivery operation and the information obtaining operation are the same at the first embodiment shown in FIGS. 4 and 5, therefore, the same explanations are omitted. When the robot 15 finished the operation from the step S31 to the step S35, or the robot 15 was not received the identified result from the person identifying apparatus 16, (No at the step S33), the robot 15 executes the same operation being the step S5 to the step S8 shown in FIG. 3 in the first embodiment, at step S36 to step S39 in FIG. 8. Therefore, the same explanation is omitted. When the robot 15 finished the step S39, the operation of the robot 15 returns to the step S31.

Figure 10:
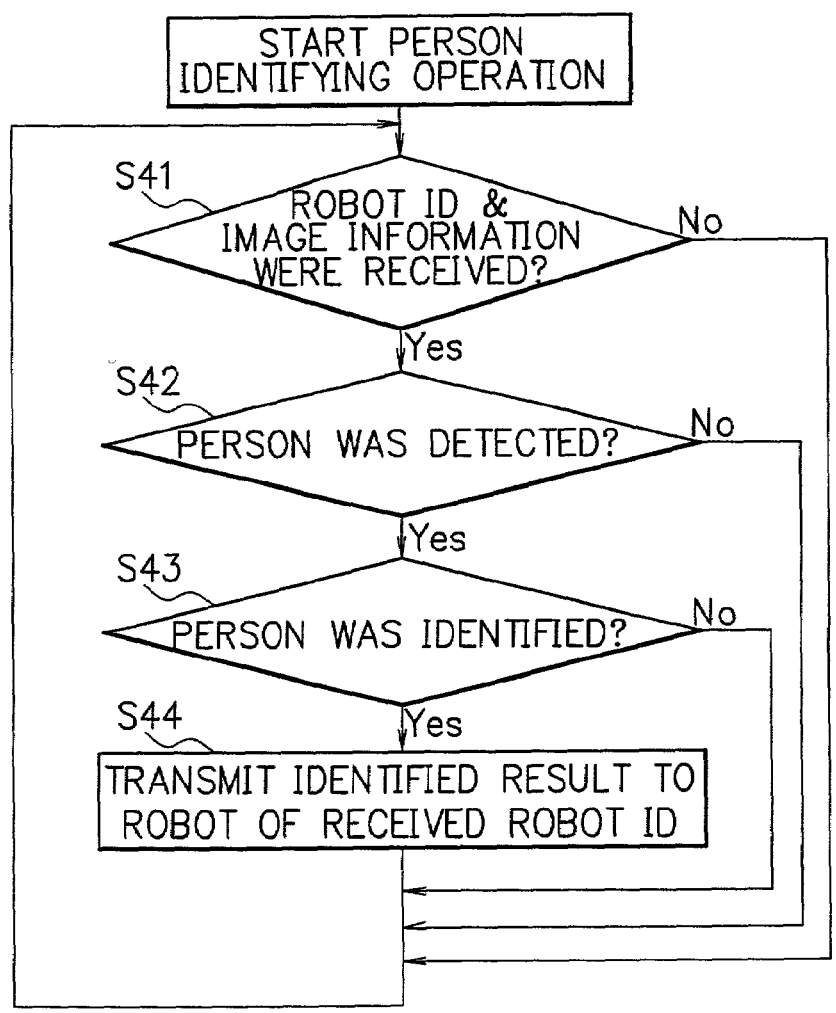
FIG. 10 is a flowchart showing person identifying operation at the person identifying apparatus at the second embodiment of the information delivery system of the present invention.

FIG. 10 is a flowchart showing person identifying operation at the person identifying apparatus 16 at the second embodiment of the information delivery system of the present invention. The person identifying apparatus 16 executes the person identifying operation based on the image information transmitted from the robot 15. When the person identifying apparatus 16 detects a person, the person identifying apparatus 16 identifies the person and transmits the identified result being the user ID of the identified person to the robot 15.

Referring to the flowchart shown in FIG. 10, the operation of the person identifying apparatus 16 is explained in detail. The person identifying apparatus 16 receives the robot ID and the image information transmitted from the robot 15 at the communication means 17 (Yes at step S41). When the person identifying apparatus 16 detected a person at the person detecting means 5 from the information received from the communication means 17 (Yes at step S42), the person identifying means 6 identifies the person detected at the person detecting means 5. When the person identifying means 6 identified the person (Yes at step S43), the person identifying means 6 sends the identified result being the user ID of the identified person to the communication means 17. The communication means 17 transmits the user ID of the identified person to the robot 15 of the robot ID via the network 3 (step S44). When the steps from S41 to S44 finished, or the person identifying apparatus 16 did not receive the robot ID and the image information (No at the step S41), or a person was not detected (No at the step S42), or the person was detected but not identified (No at the step S43), the person identifying operation returns to the step S41.

At the embodiments of the present invention, persons are identified by image information, however, the persons can be identified by each voice of the persons by providing a voice inputting means. And also at the embodiments of the present invention, the robot 1 and the robot 15 provide the robot movement means 12 and can move, however, the robots 1 and 15 can obtain information and deliver information even when the robots 1 and 15 do not move. Therefore, the obstacle detecting sensor 10, the obstacle avoiding movement control means 11, and the robot movement means 12 can be omitted from the robots 1 and 15.

And at the embodiments of the present invention, as the network 3, a local area network (LAN) is utilized. However, by connecting the network 3 to the Internet, and by relating the address of e-mail of each user to the user ID of each user, information such as an e-mail to a specified user can be stored in the shared information storage 14. That is, each of the robots 1 and 15 can be used as an e-mail terminal.

Further, the operation of the information delivery system of the present invention can be realized by making a computer execute a computer program. The computer program is stored in an optical recording medium, a magnetic recording medium, a magneto-optical recording medium, or a semiconductor memory. Or the computer program is downloaded from a program server via a network by using file transfer protocol (FTP).

As mentioned above, according to the information delivery system of the present invention, users can obtain information from a wide range, without limited to a moving range of one robot. Because, plural robots are connected to a common information server, and the plural robots share the information to be delivered to each user of the users. And even in a range exceeding the moving range of one robot, by disposing plural robots, which share the information to be delivered to each user of the users, the user can obtain the information from a wide range where the plural robots move.

Further, in the surroundings where plural robots are disposed, users can obtain information effectively. Because, plural robots are connected to a common information server, and the plural robots share the information to be delivered to each user of the users. That is, each user of the users can obtain information without selecting a specified robot.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An information delivery system, comprising:
    plural robots;
    an information server for storing information transmitted from said plural robots; and
    a network for connecting said plural robots and said information server, wherein:
    each of said plural robots, comprising:
    a person identifying means for identifying persons surrounding each robot;
    a person inquiring means for transmitting the user ID of a person identified by said person identifying means to said information server via said network, in order to inquire said identified person;
    an information exchanging means for exchanging information with said information server via said network; and
    an information delivering means for delivering information obtained from said information server by using said information exchanging means to said identified person, and
    said information server, comprising:
    an information exchanging means for exchanging information with said plural robots via said network;
    shared information storage for storing information transmitted from said plural robots, wherein:
    in case that said shared information storage has information for said identified person inquired by said person inquiring means, said information server transmits said information to said robot who inquired said identified person; and
    a robot movement means for making said robot move by a moving instruction from said information server or by an automatic movement program, wherein:
    the allocation among said plural robots is optimized by said robot movement means of each robot.

2. An information delivery system in accordance with claim 1, wherein:
    each of said plural robots, further comprising:
    an information memorizing means for memorizing information to be delivered to another user, when said identified user desires to deliver said memorized information to another user; and
    an input means for inputting the user ID of another user and information to be delivered to another user if any, when said identified user desires to deliver said information to another user, wherein:
    said information to be delivered to another user is transmitted from said robot to said information server and stored in said shared information storage.

3. An information delivery system in accordance with claim 1, wherein:
    said person identifying means detects said persons by image recognition or voice recognition and identifies said persons by the result of said image recognition or said voice recognition.

4. An information delivery system in accordance with claim 1, wherein:
    each of said plural robots, further comprising:
    an obstacle detecting means for detecting obstacles in the moving direction of said robot; and
    an obstacle avoiding means for avoiding said obstacles based on information from said obstacle detecting means.

5. An information delivery system, comprising:
    plural robots;
    a person identifying apparatus;
    an information server for storing information transmitted from said plural robots; and
    a network for connecting said plural robots, said person identifying apparatus, and said information server, wherein:
    each of said plural robots, comprising:
    an image or voice obtaining means for obtaining images or voices of persons surrounding each robot;

an information exchanging means for exchanging information with said person identifying apparatus and said information server via said network;
an information memorizing means for memorizing information to be delivered to another user;
an input means for inputting the user ID of another user and information to be delivered to another user if any;
an information delivering means for delivering information obtained from said information server by using said information exchanging means to an identified person;
a robot movement means for making said robot move by a moving instruction from said information server or by an automatic movement program;
an obstacle detecting means for detecting obstacles in the moving direction of said robot; and
an obstacle avoiding means for avoiding said obstacles based on information from said obstacle detecting means, and
said information server, comprising:
an information exchanging means for exchanging information with said plural robots and said person identifying apparatus via said network; and
shared information storage for storing information transmitted from said plural robots, and
said person identifying apparatus, comprising:
an information exchanging means for exchanging information with said plural robots and said information server; and
a person detecting means for detecting persons from said information transmitted from each of said plural robots; and
a person identifying means for identifying said person detected at said person detecting means, wherein:
when said robot transmits said information obtained at said image or voice obtaining means and the robot ID of said robot to said person identifying apparatus, and said person identifying apparatus identified a person from said information transmitted from said robot,
said person identifying apparatus transmits information of said identified person to said robot, and
said robot receives information to be delivered to said identified person from said information server by transmitting said information transmitted from said person identifying apparatus, and delivers said information to said identified person at said information delivering means, and
when said identified person desires to transmit information to another person, said identified person make said information memorizing means memory information to be delivered to another person and input the user ID of another person at said input means and input information to be delivered to another person if any, and transmits said user ID and said information to said information server, and said information server stores said information to be delivered to another person, and
when said robot delivered said information to said identified person, the allocation among said plural robots is optimized by said robot movement means of each robot by said moving instruction from said information server or said automatic movement program of each robot, by that said plural robots move by using said robot movement means, said obstacle detecting means and said obstacle avoiding means.

6. An information delivery method that delivers information to each of plural robots by using an information server which stores information transmitted from said plural robots and a network which connects said plural robots and said information server, comprising the steps of:
identifying persons surrounding each robot by each of said plural robots;
inquiring an identified person by transmitting the user ID of said identified person to said information server from said robot via said network;
transmitting information to said robot from said information server, when said information server has said information to be delivered to said identified person based on said inquiry from said robot;
receiving said information transmitted from said information server at said robot;
delivering information received from said information server to said identified person; and
making said robot move by a moving instruction from said information server or by an automatic movement program, wherein:
the allocation among said plural robots is optimized by said robot movement means of each robot.

7. An information delivery method in accordance with claim 6, further comprising the steps of:
in case that said identified person desires to deliver information to another user,
memorizing information to be delivered to another user in said robot;
inputting the user ID of another user and information to be delivered to another user if any; and
transmitting said user ID and said information to be delivered to another user to said information server; and
storing said user ID and said information to be delivered to another user in said information server.

8. An information delivery method in accordance with claim 6, wherein:
said identifying persons is executed by detecting said persons by image recognition or voice recognition.

9. An information delivery method in accordance with claim 6, further comprising the steps of:
detecting obstacles in the moving direction of said robot; and
avoiding said obstacles based on information from said obstacle detecting means, when said robot moves.

10. An information delivery method that delivers information to each of plural robots by using an information server which stores information transmitted from said plural robots and a person identifying apparatus and a network which connects said plural robots and said information server and said person identifying apparatus, comprising the steps of:
obtaining images or voices of persons surrounding each robot at each of said plural robots;
transmitting said image or voice of a person obtained at each robot and the robot ID of said robot from said robot to said person identifying apparatus via said network;
identifying said person at said person identifying apparatus;
transmitting identified result at said person identifying apparatus to said robot via said network;
transmitting said identified result to said information server from said robot;
transmitting information to be delivered to said identified person from said information server to said robot via said network, when said information server has said information to be delivered to said identified person;

receiving said information to be delivered to said identified person at said robot; and delivering said information to said identified person, and in case that said identified person desires to deliver information to another user, memorizing information to be delivered to another user and inputting the user ID of another user and information to be delivered to another user if any at said robot;

transmitting said user ID and said memorized information to said information server from said robot via said network; and storing said user ID and said information in said information server, and in case that said robot did not obtain any image or voice of a person, making said robot move by a moving instruction from said information server or by an automatic movement program, by avoiding obstacles by detecting obstacles in the moving direction of said robot; and making optimum allocation among said plural robots.

11. An information delivery program of an information delivery system that delivers information to each of plural robots by using an information server which stores information transmitted from said plural robots and a network which connects said plural robots and said information server, comprising the steps of:

identifying persons surrounding each robot by each of said plural robots;

inquiring an identified person by transmitting the user ID of said identified person to said information server from said robot via said network;

transmitting information to said robot from said information server, when said information server has said information to be delivered to said identified person based on said inquiry from said robot;

receiving said information transmitted from said information server at said robot;

delivering information received from said information server to said identified person; and making said robot move by a moving instruction from said information server or by an automatic movement program, wherein:

the allocation among said plural robots is optimized by said robot movement means of each robot.

12. An information delivery program in accordance with claim 11, further comprising the steps of:

in case that said identified person desires to deliver information to another user, memorizing information to be delivered to another user in said robot;

inputting the user ID of another user and information to be delivered to another user if any; and transmitting said user ID and said information to be delivered to another user to said information server; and storing said user ID and said information to be delivered to another user in said information server.

13. An information delivery program in accordance with claim 11, wherein:

said identifying persons is executed by detecting said persons by image recognition or voice recognition.

14. An information delivery program in accordance with claim 11, further comprising the steps of:

detecting obstacles in the moving direction of said robot; and avoiding said obstacles based on information from said obstacle detecting means, when said robot moves.

15. An information delivery program of an information delivery system that delivers information to each of plural robots by using an information server which stores information transmitted from said plural robots and a person identifying apparatus and a network which connects said plural robots and said information server and said person identifying apparatus, comprising the steps of:

obtaining images or voices of persons surrounding each robot at each of said plural robots;

transmitting said image or voice of a person obtained at each robot and the robot ID of said robot from said robot to said person identifying apparatus via said network;

identifying said person at said person identifying apparatus;

transmitting identified result at said person identifying apparatus to said robot via said network;

transmitting said identified result to said information server;

transmitting information to be delivered to said identified person from said information server to said robot via said network, when said information server has said information to be delivered to said identified person;

receiving said information to be delivered to said identified person at said robot; and delivering said information to said identified person, and in case that said identified person desires to deliver information to another user, memorizing information to be delivered to another user and inputting the user ID of another user and information to be delivered to another user if any at said robot;

transmitting said user ID and said memorized information to said information server from said robot via said network; and storing said user ID and said information in said information server,and in case that said robot did not obtain any image or voice of a person, making said robot move by a moving instruction from said information server or by an automatic movement program, by avoiding obstacles by detecting obstacles in the moving direction of said robot; and making optimum allocation among said plural robots.

* * * * *